Feb. 5, 1946.  L. A. CLARKE  2,394,368
ALKYLATION OF HYDROCARBONS
Filed March 19, 1940
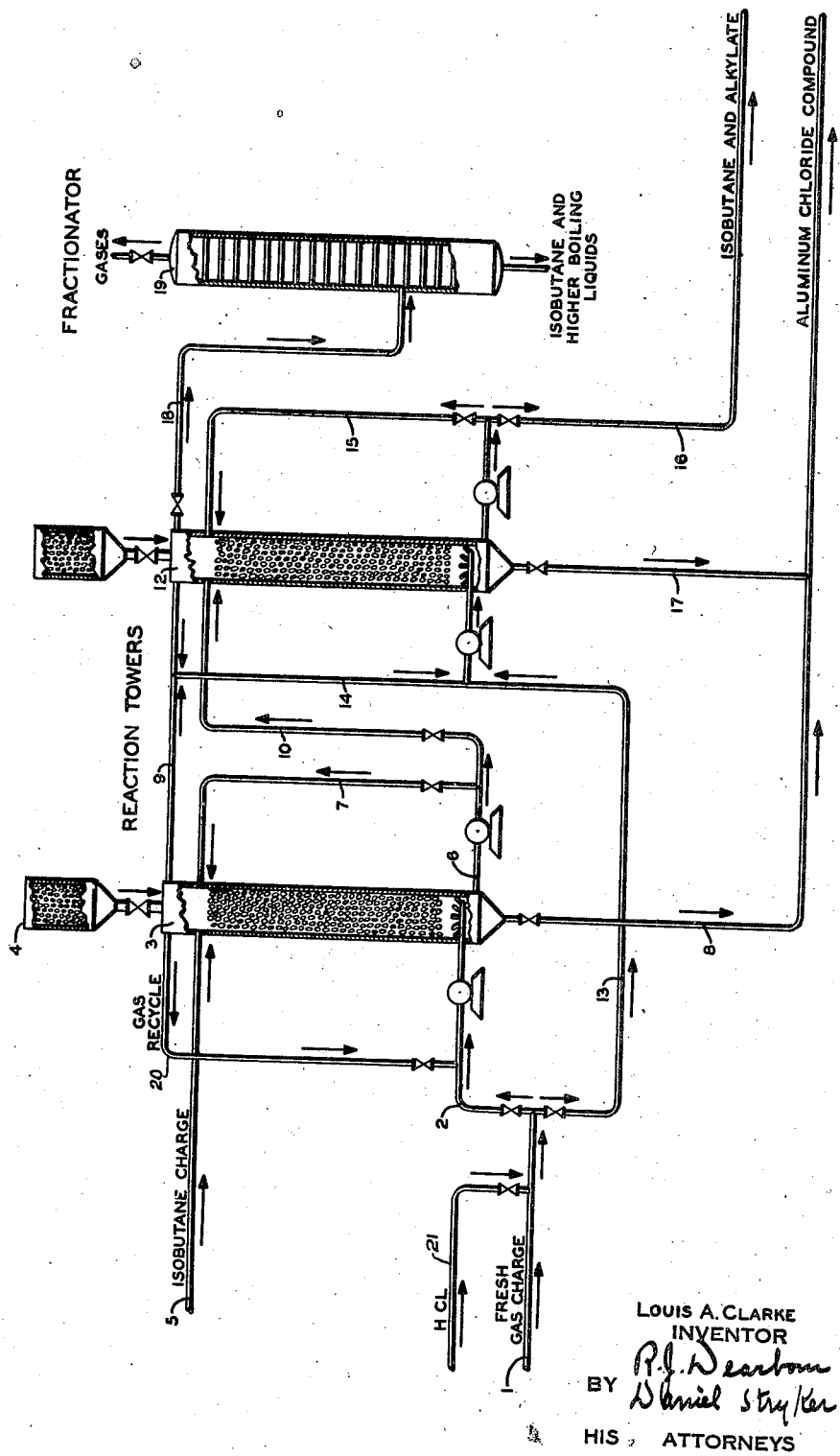
LOUIS A. CLARKE
INVENTOR
BY
HIS ATTORNEYS Patented Feb. 5, 1946

2,394,368

UNITED STATES PATENT OFFICE 2,394,368

ALKYLATION OF HYDROCARBONS

Louis A. Clarke, Fishkill, N. Y., assignor, by mesne assignments, to The Texas Company, New York, N. Y., a corporation of Delaware Application March 19, 1940, Serial No. 324,784

7 Claims. (Cl. 260—683.4)

This invention relates to the alkylation of isoparaffin hydrocarbons with olefin hydrocarbons in the presence of an alkylation catalyst comprising a metallic halide and has particular application to the manufacture of high anti-knock gasoline hydrocarbons suitable for use in the production of motor fuels.

Broadly the invention contemplates a continuous process of alkylation wherein the feed hydrocarbons are subjected to reaction in a reaction zone or in a plurality of reaction zones containing the solid catalyst in divided or pulverulent form and in which zone or zones the solid catalyst is continuously subjected to washing during the reaction so as to maintain it in an active form.

The invention is particularly applicable to the continuous alkylation of ethylene with isobutane for the production of high anti-knock motor fuel hydrocarbons.

Alkylation of isobutane with ethylene by contact with aluminum chloride has been proposed previously. For example, U. S. Patent No. 2,174,883 describes a batch type of operation carried out at relatively low temperature. Heretofore considerable difficulty has been experienced in attempting to effect the reaction with this type of catalyst in a continuous type of operation due to the relatively short catalyst life. The solid particles of aluminum chloride rapidly become coated during the reaction with a gummy fluid complex of aluminum chloride and hydrocarbons so that the catalyst is soon rendered substantially ineffective.

In accordance with the present invention the catalyst is subjected to continuous washing with liquid hydrocarbons in situ and during the reaction so as to remove the undesired complex material substantially as rapidly as formed. Moreover, the process is effected at somewhat higher temperatures than disclosed, for example, in the above-mentioned patent. It has been found that while the reaction between ethylene and isobutane proceeds very slowly at around 70° F. or lower, the reaction is much more rapid at a temperature of around 110 or 120° F. or in the range 110° F. to 130° F.

In carrying out the continuous process of this invention one or more reaction vessels packed with the solid catalyst in lump or granular form are employed. The gaseous olefin hydrocarbons are introduced to the lower portion of the reaction vessel, while the isoparaffin is advantageously introduced to the upper portion thereof. The operation is thus conducted so that there is liquid flow from top to bottom of the reaction tower, while gaseous flow is from bottom to top.

Gaseous materials, including inert and unreacted hydrocarbons, are removed from the top of the tower and the reacted hydrocarbons, including gasoline hydrocarbons, are accumulated in the bottom of the tower together with the complex metallic halide-hydrocarbon compounds washed from the solid catalyst during the reaction.

The isoparaffin hydrocarbon is introduced to the reaction tower substantially in excess of that required for reaction with the olefin hydrocarbons in the feed and provision is made for recycling a substantial proportion of liquid hydrocarbons, including isoparaffin. Excess isoparaffin and alkylated hydrocarbons are separated from the reaction mixture accumulating in the bottom of the tower and returned in substantial amount to the top of the tower so as to provide a reflux in sufficient quantity to continuously wash the solid catalyst supported within the tower.

The complex metallic halide-hydrocarbon compounds segregated from the reaction mixture are continuously discharged from the system.

Advantageously the reaction is effected in the presence of a small amount of a promoter substance, such as propylene or butylene, etc. That portion of the reaction mixture separated from the complex compounds and not recycled is drawn off and further processed to recover the alkylated hydrocarbons. However, where a plurality of reaction towers or zones are employed, all or a portion of this non-recycled mixture may be passed to the succeeding zone so that any unreacted olefin hydrocarbons present may be again subjected to contact with an additional quantity of isoparaffin hydrocarbons. Gaseous olefin feed may be introduced to the succeeding reaction zone along with, or in addition to, the mixture entering such succeeding zone from the preceding zone.

In order to explain the process more completely reference will now be made to the accompanying drawing illustrating, by means of a flow diagram, one method of carrying out the process:

As indicated in the drawing, a gaseous hydrocarbon feed, comprising mainly ethylene, is conducted from a source not shown through a pipe 1 and branch pipe 2 to the lower portion of a reaction tower 3.

The reaction tower is packed with aluminum chloride in lump or granular form. The catalyst may be supported within the tower in any suitable manner. Thus, it may be in the form of a single relatively deep bed or in the form of a plurality of relatively shallow beds, depending upon the height of the tower.

As indicated in the drawing, however, a single bed of catalyst is provided, since this facilitates the addition of fresh catalyst to the tower during the operation of the process from a hopper device 4. In this way a bed of uniform depth may be maintained continuously during the operation of the process.

A hydrocarbon fraction containing mainly isoparaffin hydrocarbons, such as isobutane, is conducted from a source not shown through a pipe 5 and introduced to the upper portion of the tower 3. The isoparaffin hydrocarbon is introduced substantially in excess of that required for reaction with the olefin and may, for example, be introduced so as to provide a molal ratio of five parts of isoparaffin to one part of ethylene.

A temperature of around 100 to 130° F. is maintained within the tower. The temperature may be maintained in this range by passing a cooling medium through a jacket surrounding the reaction tower or through coils supported within the contact mass. The necessary cooling may also be provided by adjusting the temperature of the isoparaffin hydrocarbon feed, a part of which feed may be introduced at different levels within the tower.

A pressure of around 125 to 200 pounds may be maintained within the tower, or a pressure sufficient to maintain at least a substantial portion of the isoparaffin feed in the liquid phase within the tower.

Under these conditions, reaction between the olefin and isoparaffin feed hydrocarbons results in forming alkylated hydrocarbons comprising gasoline hydrocarbons.

The alkylated hydrocarbons, including unreacted isobutane, flow downwardly through the tower and accumulate in the bottom thereof, from which they are withdrawn through a pipe 6 and by means of a pump.

A portion of the withdrawn mixture is returned through a pipe 7 to the top of the tower and introduced thereto at a point above the contact mass, thus providing a reflux of wash liquid.

This wash liquid flows back down through the contact mass and washes from the solid catalyst particles the complex aluminum chloride-hydrocarbon compounds formed during the reaction and adhering to the solid catalyst. The wash liquid and removed complex compounds also accumulate in the bottom of the tower.

Advantageously, sufficient settling space is provided in the bottom of the tower in which to effect settling and separation into phases, the lower phase comprising the undesired complex compounds and aluminum chloride sludge, while the upper phase comprises alkylated hydrocarbons and isoparaffin hydrocarbons.

The complex material is discharged from the system through a pipe 8.

If desired, this phase separation may be effected in a separate settling vessel located outside the tower.

Gaseous material accumulating in the top of the tower, such as methane, ethane and hydrogen, is withdrawn through a pipe 9 for ultimate discharge from the system. However, in the event that these gases include unreacted hydrocarbons they may be passed to the next succeeding stage, as will be described, or may be recycled through pipe 20 to the bottom of the tower, reentering the tower with the fresh feed.

In order to activate the catalyst a small amount of hydrogen chloride may be introduced from a pipe 21 with the feed hydrocarbons to the reaction tower 3; also, it is advantageous to promote the reaction by effecting it in the presence of a small amount of more reactive and higher molecular weight olefin hydrocarbons, such as propylene and butylene. The amount of propylene added as a promoter may be in the range of around 1 to less than 20% by weight of the olefin present in the feed.

The portion of alkylated hydrocarbons and isoparaffin hydrocarbons not recycled through the pipe 7 is passed through a pipe 10 leading to the upper portion of a reaction tower 12, similar to the reaction tower 3. Fresh olefin feed conducted from pipe 1 and branch pipe 13 is introduced to the lower portion of the reaction tower 12, together with gaseous constituents from pipe 14 communicating with pipe 9 previously referred to.

The operation of the reaction tower 12 is similar to that described for the reaction tower 3, provision being made for withdrawal of unreacted isoparaffin and alkylated hydrocarbons, a portion of which is recycled to the top of the tower through a pipe 15. That portion not recycled is passed through a pipe 16 to a fractionator not shown wherein the product is fractionated to produce gasoline fractions of desired boiling range. The complex compounds accumulating in the bottom of the reaction tower 12 are drawn through a pipe 17 for discharge from the system.

The gaseous materials, including methane, ethane, hydrogen, etc., accumulating in the top of the tower 12, are withdrawn through a pipe 18 and passed to a fractionator 19 wherein the hydrocarbons, comprising isobutane and higher boiling liquid, may be recovered for further disposition, as, for example, recycling through the system.

While two reaction towers have been described, it is contemplated that any number of towers may be employed. If desired, a single relatively tall tower may be used.

In accordance with the invention, in reacting ethylene with isobutane in the presence of aluminum chloride, a product is obtained which boils within the gasoline range and 96% by volume of which boils below 311° F., this product having a knock rating of about 89 to 92 C. F. R. M. It is possible to distil from the product a fraction amounting to 85% by volume of the product and boiling around 136° F., which has an octane rating of 95 C. F. R. M.

While aluminum chloride has been mentioned specifically, nevertheless, it is contemplated that other metallic halides, such as aluminum bromide and zirconium chloride, may be employed.

The alkylation of a gaseous olefin fraction, consisting essentially of ethylene, has been specifically described above. However, it is contemplated that the process may be applied to the alkylation of other olefins, including $C_3$ olefin. Also, higher molecular weight isoparaffin hydrocarbons, besides isobutane, may be used.

Obviously many modifications and variations of the invention, as hereinbefore set forth, may be made without departing from the spirit and scope thereof, and therefore only such limitations should be imposed as are indicated in the appended claims.

I claim:

1. In a continuous process for alkylating normally gaseous olefins with isoparaffin hydrocarbons by contact with an alkylation catalyst comprising an active metallic halide in solid particle form, the steps comprising maintaining a reaction tower packed with the solid metallic halide particles, introducing the olefin feed to the lower portion of said tower, introducing the isoparaffin feed to the upper portion thereof substantially in excess of that required for reaction with the olefins, maintaining the tower at a temperature sufficient to effect the alkylation reaction, maintaining the tower under pressure sufficient to maintain at least a substantial portion of the isoparaffin feed in the liquid phase, whereby isoparaffin is alkylated by the olefin to produce gasoline hydrocarbons of high anti-knock value while the solid particles of the catalyst bed tend to become coated with metallic halide-hydrocarbon complex removing gaseous material, including inert and unreacted hydrocarbons, from the top of said tower, accumulating from the lower portion of said tower liquid hydrocarbons including excess isoparaffin and alkylated gasoline hydrocarbons together with metallic halide-hydrocarbon complex material formed during the reaction, separating the complex material from the accumulated liquid hydrocarbons, removing the separated complex material, and continuously recycling to the upper portion of the tower a portion of the said liquid hydrocarbons substantially free from complex material and in amount sufficient to continuously wash complex material from the solid metallic halide particles which are maintained packed within the tower.

2. In the alkylation of a low-boiling isoparaffin with a normally gaseous olefin in the presence of a metallic halide alkylation catalyst for the production of gasoline hydrocarbons of high anti-knock value, the method which comprises maintaining a fixed bed consisting essentially of solid particles of active metallic halide alkylation catalyst in a reaction zone, continuously passing the isoparaffin and the normally gaseous olefin with the isoparaffin in molar excess of the olefin through said bed under conditions such that isoparaffin is alkylated by the olefin to produce gasoline hydrocarbons of high anti-knock value, while the solid particles of the catalyst bed tend to become coated with metallic halide-hydrocarbon complex, simultaneously passing through said bed a substantial proportion of previously formed liquid hydrocarbon reaction products of said alkylation reaction to continuously wash the coating of metallic halide-hydrocarbon complex from the particles of said fixed catalyst bed, removing from said reaction zone liquid hydrocarbon reaction products together with metallic halide-hydrocarbon complex washed from said fixed bed of active metallic halide particles, separating the liquid hydrocarbon reaction products from said complex thus removed from the fixed bed, dividing said separated liquid hydrocarbon reaction products and diverting one portion thereof to fractionation for the recovery of alkylate therefrom, and directly recycling another portion of said separated liquid hydrocarbon reaction products to said reaction zone to serve as the above mentioned washing liquid for the fixed catalyst bed, whereby the metallic halide-hydrocarbon complex coating is continuously removed from the metallic halide particles to maintain high activity of said fixed metallic halide catalyst bed over substantial periods of continuous operation.

3. The method in accordance with claim 2, wherein the isoparaffin is introduced in liquid phase and the olefin is introduced in gas phase into said reaction zone, and the liquid isoparaffin and gaseous olefin flow countercurrently to each other through said bed.

4. The method in accordance with claim 2, wherein an elongated vertical reaction zone containing the confined catalyst bed is provided, isoparaffin is introduced in liquid phase adjacent the upper end of said reaction zone and olefin is introduced in gas phase adjacent the lower end of said reaction zone, the liquid isoparaffin and the gaseous olefin flowing countercurrently to each other through said bed, and the said recycled liquid hydrocarbon reaction products are introduced into said reaction zone adjacent the upper end of said bed and flow downwardly therethrough.

5. The method of continuously alkylating a low-boiling isoparaffin with a normally gaseous olefin of lower molecular weight than the said isoparaffin in the presence of an active metallic halide alkylation catalyst, which comprises continuously feeding the normally gaseous olefin in gas phase and the low-boiling isoparaffin in liquid phase, with the isoparaffin in substantial molar excess of the olefin, into a reaction zone and passing the same in contact with each other through a maintained and relatively fixed body of the metallic halide catalyst under alkylating conditions, whereby isoparaffin is alkylated by the olefin to produce a normally liquid alkylate comprising gasoline hydrocarbons of high anti-knock value, continuously removing a liquid stream of reaction products comprising alkylate and excess isoparaffin substantially free from olefin from the reaction zone and recovering alkylate therefrom, separately removing a gaseous stream comprising unreacted olefin from the reaction zone, and recycling at least a portion of said gaseous stream in gas phase to said olefin feed for return to the reaction zone.

6. The method of continuously alkylating a low boiling isoparaffin with a normally gaseous olefin in the presence of an aluminum chloride alkylation catalyst, which comprises continuously feeding the olefin in gaseous phase and the isoparaffin, with the isoparaffin in substantial molar excess of the olefin, into a reaction zone containing a maintained and relatively fixed body of the aluminum chloride alkylation catalyst, providing a pressure within said reaction zone to maintain at least a substantial portion of the low boiling isoparaffin in liquid phase therein, passing the olefin in gas phase upwardly and the isoparaffin in liquid phase downwardly through the maintained and relatively fixed body of aluminum chloride alkylation catalyst in countercurrent contact with each other under alkylating conditions, whereby isoparaffin is alkylated with the olefin to produce an alkylate comprising gasoline hydrocarbons of high anti-knock value, continuously withdrawing a stream of reaction products from said reaction zone and recovering alkylate therefrom.

7. The method of continuously alkylating a low boiling isoparaffin with a normally gaseous olefin of lower molecular weight than the said isoparaffin in the presence of an active metallic halide alkylation catalyst, which comprises continuously passing the normally gaseous olefin in gas phase and the low boiling isoparaffin in liquid phase, with the isoparaffin in substantial molar excess of the olefin, in contact with each other through a maintained and relatively fixed body of the metallic halide catalyst in an alkylation reaction zone under alkylating conditions, whereby isoparaffin is alkylated by the olefin to produce a normally liquid alkylate comprising gasoline hydrocarbons of high anti-knock value, and wherein a gaseous hydrocarbon phase containing unreacted olefin and a liquid hydrocarbon phase comprising alkylate and excess isoparaffin continuously separate from the maintained body of catalyst in said reaction zone, continuously withdrawing a stream of said liquid hydrocarbon phase, recycling a portion of said withdrawn liquid hydrocarbon stream comprising alkylate and excess isoparaffin to the said reaction zone for repassage in liquid phase through said maintained body of catalyst, recovering alkylate from another portion of said withdrawn stream of liquid hydrocarbon phase, separately withdrawing a stream of said gaseous hydrocarbon phase containing unreacted olefin from said reaction zone, and recycling at least a portion of said gaseous stream to said olefin feed for reintroduction and repassage in gas phase through said maintained catalyst body.

LOUIS A. CLARKE.